US006457106B1

(12) United States Patent
Watanabe (10) Patent No.: US 6,457,106 B1
(45) Date of Patent: Sep. 24, 2002

(54) SHARED MEMORY CONTROL SYSTEM AND SHARED MEMORY CONTROL METHOD

(75) Inventor: Masataka Watanabe, Niigata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/120,239

(22) Filed: Jul. 22, 1998

(30) Foreign Application Priority Data

Jul. 22, 1997 (JP) .............................................. 9-196185

(51) Int. Cl.⁷ .............................................. G06F 12/00
(52) U.S. Cl. ........................ 711/147; 711/150; 711/151; 711/158; 710/240; 710/244; 710/241
(58) Field of Search ................................. 711/147, 150, 711/151, 158; 710/240, 241, 244

(56) References Cited

U.S. PATENT DOCUMENTS

| | | | |
|---|---|---|---|
| 4,839,856 A | | 6/1989 | Tanaka ........................ 364/957 |
| 5,784,582 A | * | 7/1998 | Hughes ....................... 395/297 |
| 5,809,538 A | * | 9/1998 | Pollmann et al. ........... 711/151 |
| 6,006,303 A | * | 12/1999 | Barnaby et al. ............. 710/244 |
| 6,046,982 A | * | 4/2000 | Ozveren et al. ............. 370/232 |
| 6,119,196 A | * | 9/2000 | Muller et al. ................ 710/243 |

FOREIGN PATENT DOCUMENTS

| | | | |
|---|---|---|---|
| JP | 62-149099 | 7/1987 | |
| JP | 1-205362 | 8/1989 | |
| JP | 2-4445 | 2/1990 | |
| JP | 3-137754 | 6/1991 | |
| JP | 3-216755 | 9/1991 | |
| JP | 3-257655 | 11/1991 | |
| JP | 5-89027 | 4/1993 | |
| JP | 6-259315 | 9/1994 | |
| WO | 9812645 | * 3/1998 | .................... 13/36 |

* cited by examiner

Primary Examiner—Do Hyun Yoo
Assistant Examiner—Kimberly McLean
(74) Attorney, Agent, or Firm—Foley & Lardner (57) ABSTRACT

In a current shared memory cycle, the memory access band value of each bus master is calculated at any time and discriminated to determine the next memory cycle control before completion of the current shared memory cycle, so that the minimum memory access band value required by each bus master is maintained with the result that the shared memory can be efficiently utilized. Thus, there is provided a shared memory control apparatus and a shared memory control method, capable of realizing a memory control of an excellent efficiency by maintaining the memory access band width per unit time, required by the master.

8 Claims, 9 Drawing Sheets

SHARED MEMORY CONTROL SYSTEM AND SHARED MEMORY CONTROL METHOD

BACKGROUND OF THE INVENTION

1. Field of the Invention

The present invention relates to a shared memory control system and a shared memory control method, for systematically controlling a plurality of bus masters accessing only one shared memory.

2. Description of Related Art

Figure 8:
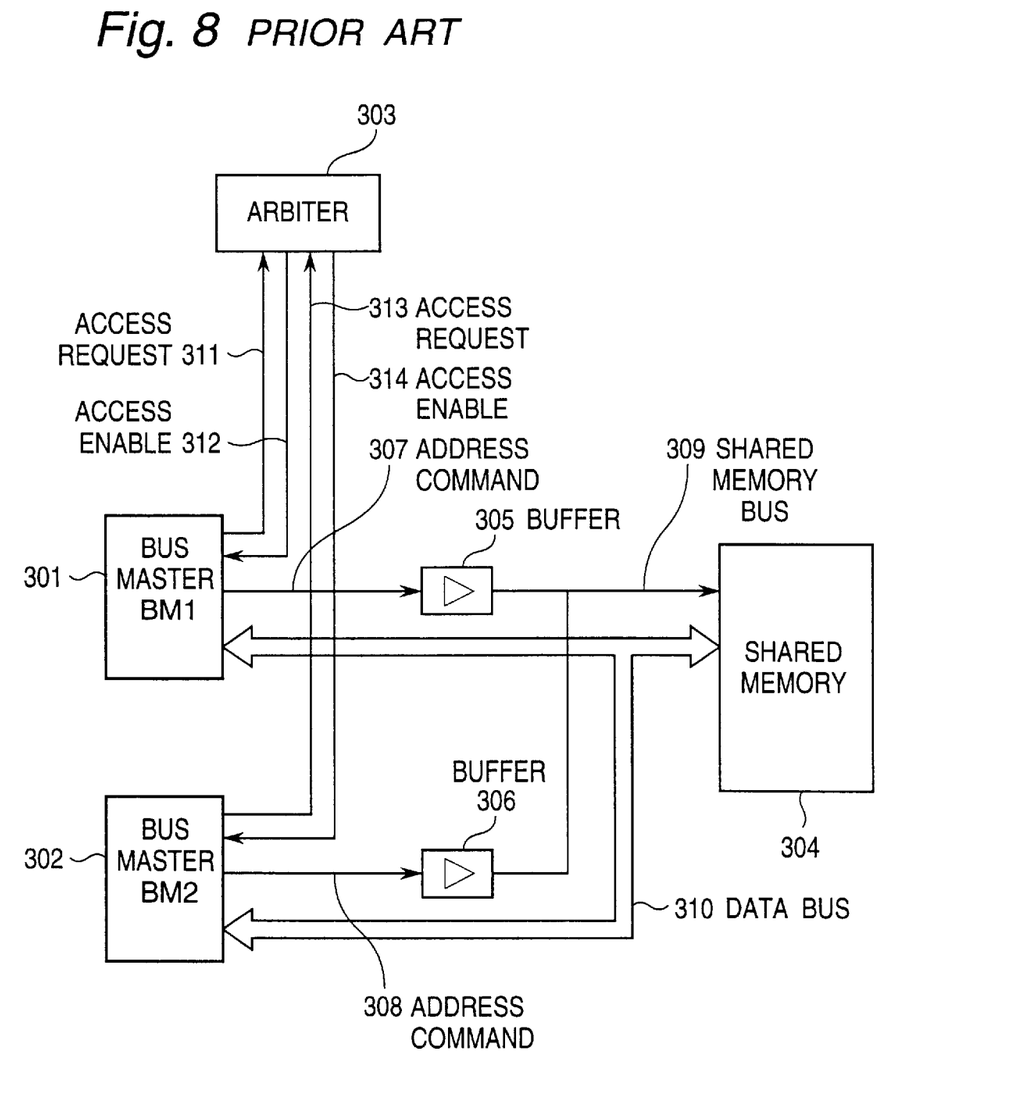
FIG. 8 is a diagram for illustrating a prior art example.

FIG. 8 is a block diagram illustrating a schematic construction of a prior art shared memory system. In this drawing, Reference Numerals 301 and 302 designate bus masters BM1 and BM2, accessing a shared memory. These bus masters and a shared memory 304 are connected by a data bus 310. Reference Numeral 303 indicates an arbiter for executing a shared memory bus arbitration.

When the bus masters BM1 and BM2 access the shared memory 304, the bus masters BM1 and BM2 dispatch a shared memory access authority request signal (access request signals 311 and 313), to inform the arbiter 303 of the shared memory access request.

The arbiter 303 executes the shared memory bus arbitration. Namely, if the access request is dispatched from the bus master BM1 or BM2 by the shared memory access request signal 311 or 313, the arbiter 303 gives an access enable signal 312 or 314 to either of the bus masters.

Now, assuming that the bus master BM1 obtains the shared memory access authority, an address command signal 307 is supplied from the bus master BM1 through a buffer 305 and a shared memory bus 309 of the shared memory 304, with the result that the memory access is performed. Similarly, when the bus master BM2 obtains the shared memory access authority, an address command signal 308 is supplied through a buffer 306 and the shared memory bus 308 of the shared memory 304, with the result that the memory access is performed.

A basic example of arbitration under the shared memory access control, mentioned above, is rotating arbitration. In a simple rotating arbitration, after the arbiter 303 gives the shared memory access authority to a bus master once, even if another bus master newly requests the shared memory access, it is necessary to maintain the bus master newly requesting the shared memory access in a waiting condition until the bus master currently holding the shared memory access authority abandons the access authority. This presents a problem.

In order to avoid this problem, the arbiter must forcibly deprive the shared memory access authority from the bus master which has the authority. Thus, the arbiter and a function circuit become disadvantageously complicated. Therefore, in order to avoid this disadvantage, for example, Japanese Patent Application Laid-open Publication No. JP-A-03-137754 discloses an access control method for determining the bus master allowed to access the shared memory at each cycle of the shared memory access. However, this method does not have a means for ensuring a memory access band width per a constant time, required for each of a plurality of bus masters accessing the shared memory.

Figure 9:
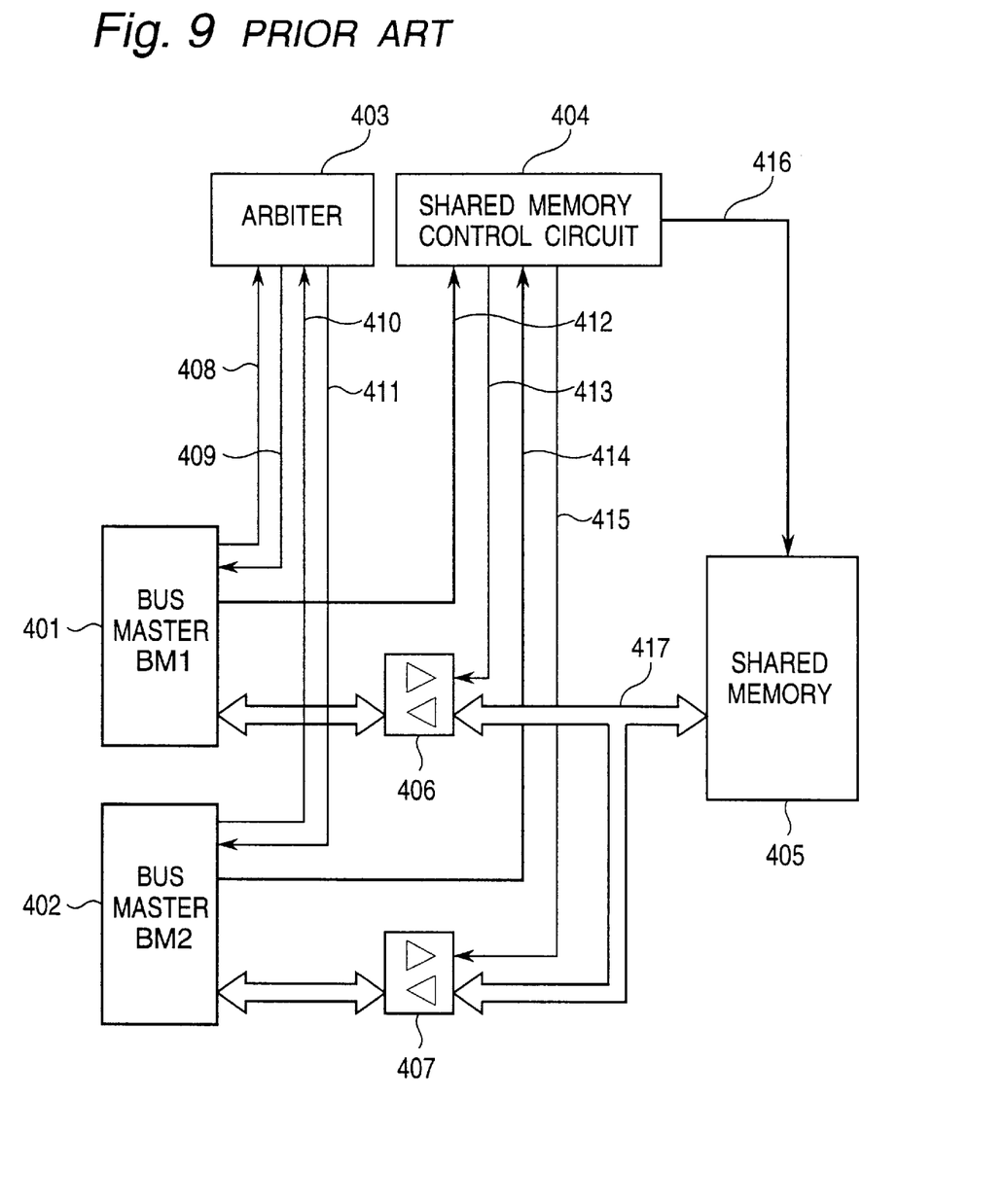
FIG. 9 is a diagram for illustrating another prior art example.

On the other hand, another prior art shared memory control system shown in FIG. 9, an address command signal given to a shared memory 405 is centrally controlled by a shared memory controller 404, and bus masters BM1 (401) and BM2 (402) using the shared memory do not directly control the address command given to the shared memory 405.

In conclusion, in the prior art shared memory control methods shown in FIGS. 8 and 9, when the bus master BM1 or BM2 obtains right to exclusively use the bus 310 or 417, a maximum exclusively occupying time of the bus is individually set for each of the bus masters BM1 and BM2 and for each bus occupying occasion. Therefore the shared memory access time is restricted so as to elevate the utilization factor of the bus 310 or 417.

Now, when there are a plurality of bus masters executing a read/write access to only one shared memory, if a bus master accessing the shared memory is replaced by another, a page address supplied to the shared memory is often changed, with the result that a page missing occurs, and a read/write processing is temporarily interrupted. This presents a problem.

In other words, the prior art shared memory control systems have a problem that it does not pay attention to an arbitration for ensuring the memory access band width per unit time, required by each bus master of a plurality of bus masters accessing the shared memory.

SUMMARY OF THE INVENTION

In view of the above mentioned circumstance, it is an object of the present invention to provide a shared memory control system and a shared memory control method, capable of realizing a memory control having an excellent efficiency by maintaining the memory access band width per unit time, required by the master.

In order to achieve the above mentioned object of the present invention, according to a first aspect of the present invention there is provided a shared memory control method wherein in a current shared memory cycle, a memory access band width of each bus master is calculated at any time, and before completion of the current shared memory cycle, a next memory cycle control is determined so as to maintain the minimum memory access band width required by each bus master.

In addition, according to a second aspect of the present invention there is provided a shared memory control apparatus including a shared memory, and a shared memory controller for controlling a plurality of bus masters accessing the shared memory, the apparatus including a calculating means for calculating, for each of the plurality of bus masters, a memory access band value $\phi$ required per a unit time to the shared memory and a shared memory access band value $\psi$ at a time in a current shared memory cycle, and a prediction and control means for comparing the memory access band value $\phi$ with the shared memory access band value $\psi$ to perform, before completion of the current shared memory cycle, a prediction processing for maintaining the shared memory access band value $\psi$.

Furthermore, according to a third aspect of the present invention there is provided a shared memory control apparatus including, a plurality of bus masters accessing only one shared memory, the apparatus including a means for comparing, for each of the bus masters, a first shared memory access band value required per a unit time, with a second shared memory access band value of each bus master calculated at any time in a current shared memory cycle, to perform a prediction processing for maintaining the first shared memory access band value at a predetermined value.

In the present invention, in the current shared memory cycle, the memory access band width value of each bus master is calculated at any time and discriminated to determine the next memory cycle control before completion of the current shared memory cycle. Thus, the minimum memory access band width value required by each bus master is maintained with the result that the shared memory can be efficiently utilized.

DETAILED DESCRIPTION OF THE PREFERRED EMBODIMENTS

Now, embodiments of the shared memory control system in accordance with the present invention will be described with reference to the drawings.

Figure 1:
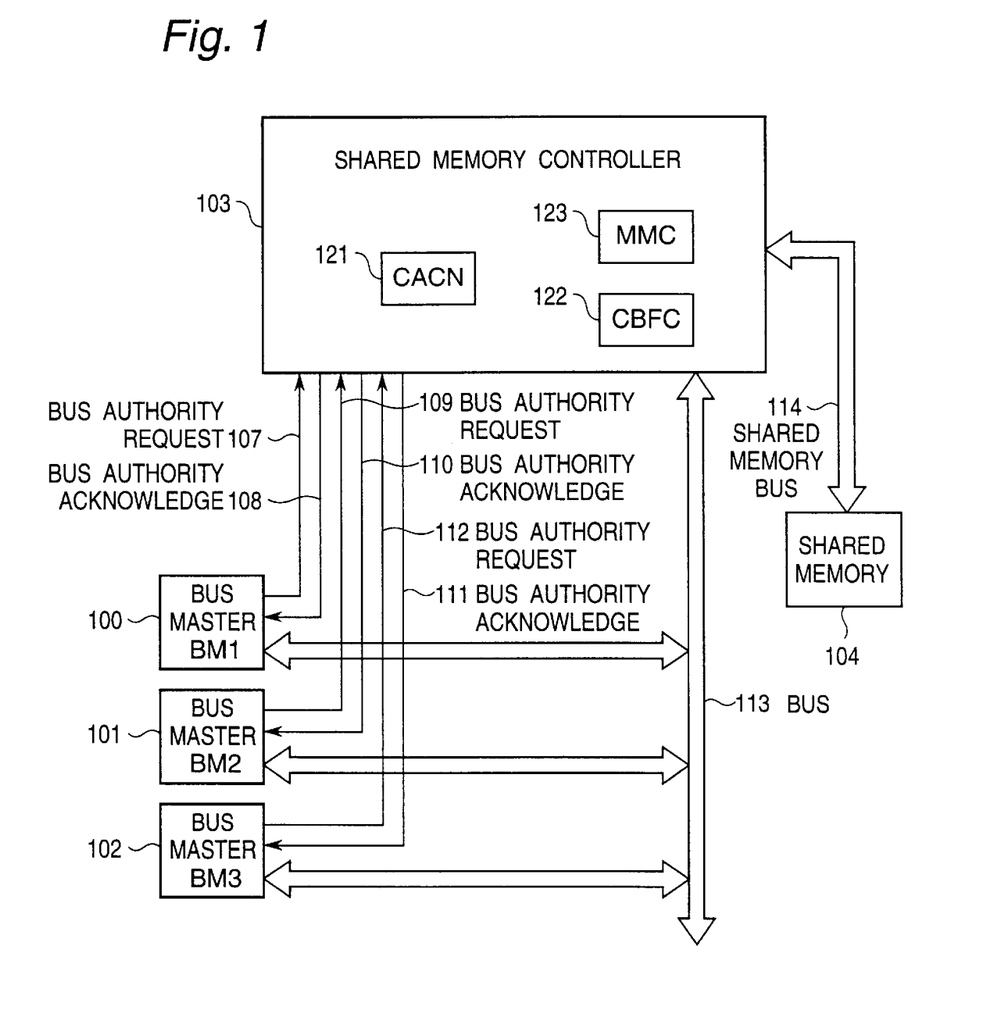
FIG. 1 is a block diagram illustrating a schematic construction of the shared memory control system in accordance with the present invention.

FIG. 1 is a block diagram illustrating a schematic construction of the shared memory control system in accordance with the present invention. In this drawing, a shared memory 104 and a shared memory controller 103 are connected to each other through a shared memory bus 114 in a one-to-one relation. The shared memory controller 103 centrally controls the shared memory 104. Bus masters BM1 (100), BM2 (101) and BM3 (103) are connected through a bus 113 to the shared memory controller 103, so that these bus masters realize a memory access to the shared memory 104 with the intermediary of the controller 103. Although this drawing illustrates an example having three bus masters the number of bus masters is in no way limited to three, and more than three bus masters can be provided.

The bus masters BM1 to BM3 dispatch a bus authority request for the bus 113 to the shared memory controller 103 by bus authority request signals 107, 109 and 112, respectively. The shared memory controller 103 outputs a bus authority acknowledge signal 108, 110 or 111 to any one of the bus masters BM1, BM2 and BM3 in order to inform the bus master that it has obtained the bus authority.

Figure 2:
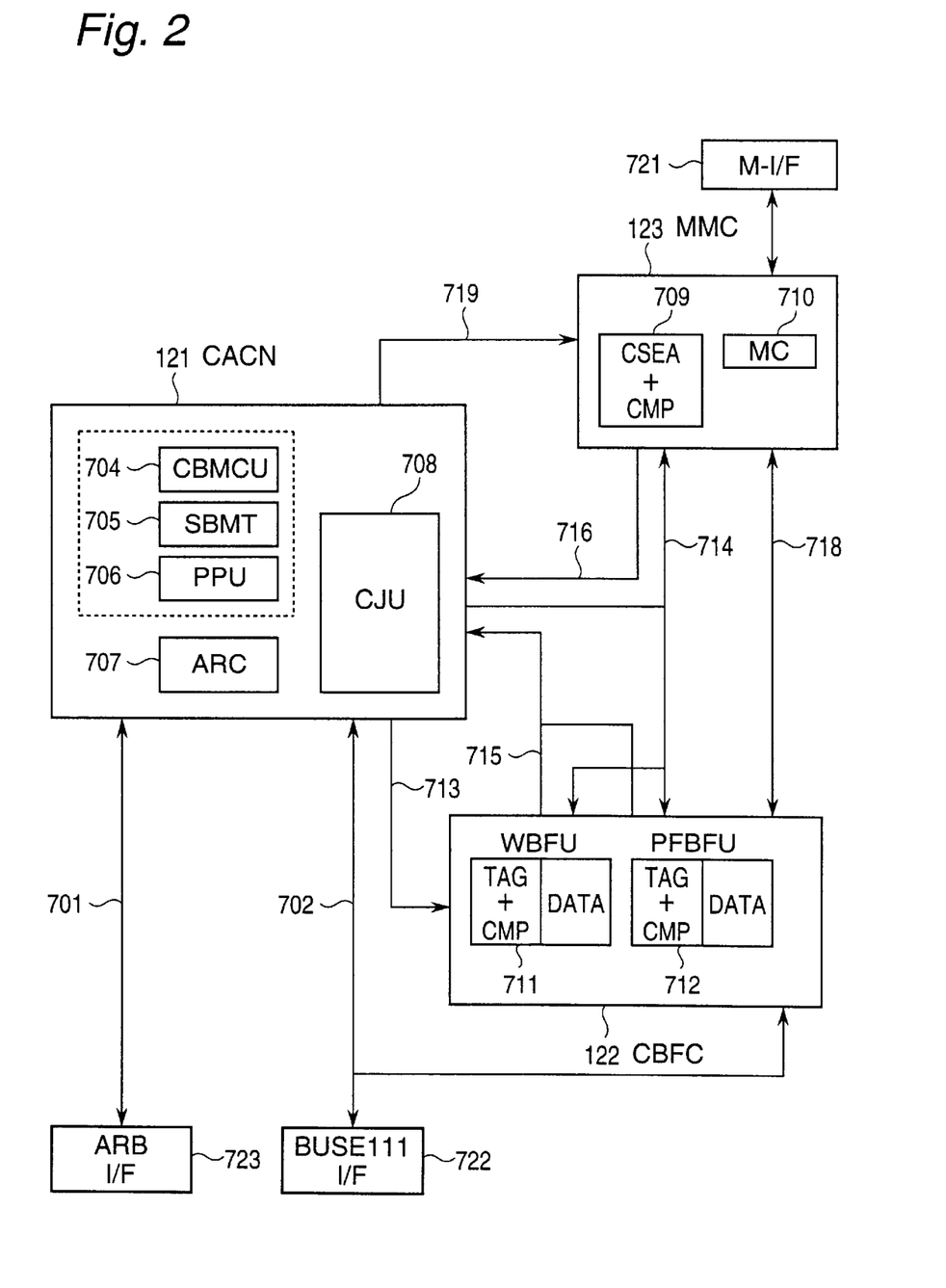
FIG. 2 is a block diagram showing the construction of the shared memory controller 103.

The shared memory controller 103 comprises a CACN 121, a CBFC 122 and a MMC 123. The MMC 123 includes a unit 709 storing a command (including an address) currently driving the shared memory 104 and a data width therefor, and also stores a starting address and an ending address of a sense amplifier of respective devices incorporated in the shared memory 104, and a unit 710 for controlling the shared memory 104.

The CBFC 122 includes a prefetch buffer unit (PFBFU) 712 for the shared memory 104 and a write buffer unit (WBFU) 711 for storing data to be written from the bus masters BM1 to BM3 to the shared memory 104.

The central branch prediction controller (CACN) 121 comprises constituents 704 to 708. The SBMT 705 records the minimum shared memory access band width value per a unit time (T) required by each of the bus masters BM1 to BM3 (in the following, the shared memory access band width value for the bus master BM1 is expressed by SBMT1, the shared memory access band width value for the bus master BM2 is expressed by SBMT2, and the shared memory access band width value for the bus master BM3 is expressed by SBMT3). With reference to the SBMT 705, the CBMCU 704 stores respective memory access achievement values of the bus masters BM1 to BM3 at a time point a (which will be described hereinafter) and a ratio between the memory access achievement values.

Here, a relation among the unit time T and the time points α, β and γ will be described with reference to FIG. 3. Assuming that the time points α, β and γ are included within a period of the unit time T, a period over 1T before the period T including the time point α is called a period T'. In addition, in FIG. 3, a starting time of the period T' is defined to be "0", and an ending time of the period T' is defined to be "t". Accordingly, a starting time of the period T is "t", and an ending time of the period T becomes "2t". Furthermore, it is also assumed that the relation between the time t and the time points α, β and γ is expressed by the following equation (1):

$$0<t<\alpha<\beta<\gamma<2t \qquad (1)$$

Returning to FIG. 2, the explanation of the construction of the CACN 121 is continued. The above mentioned CBMCU 704 records and holds the data in the period T' during the period T. At the time point α, the CBMCU 704 stores and holds the data during a period from the starting time of the period T to the time point α, and continues to update the data until the ending point of the period T. In addition, the CBMCU 704 records respective first access request time points "a", "b" and "c" of the bus masters BM1 to BM3 in the period T' and the period T, and also records and holds the number of requests (called a "RC" hereinafter) and the rate at which the bus 113 is being occupied (called an "AP" hereinafter).

Furthermore, the CBMCU 704 records a data transfer achievement rate of the respective bus masters BM1 to BM3 for SBMT1, SBMT2 and SBMT 3 during the period T' and during the period T (in the following, the data transfer achievement rate will be called a "memory access band width achievement rate", and respective memory access band width achievement rates of the bus masters BM1 to BM3 will be expressed by "MAP1", "MAP2" and "MAP3").

Figure 3:
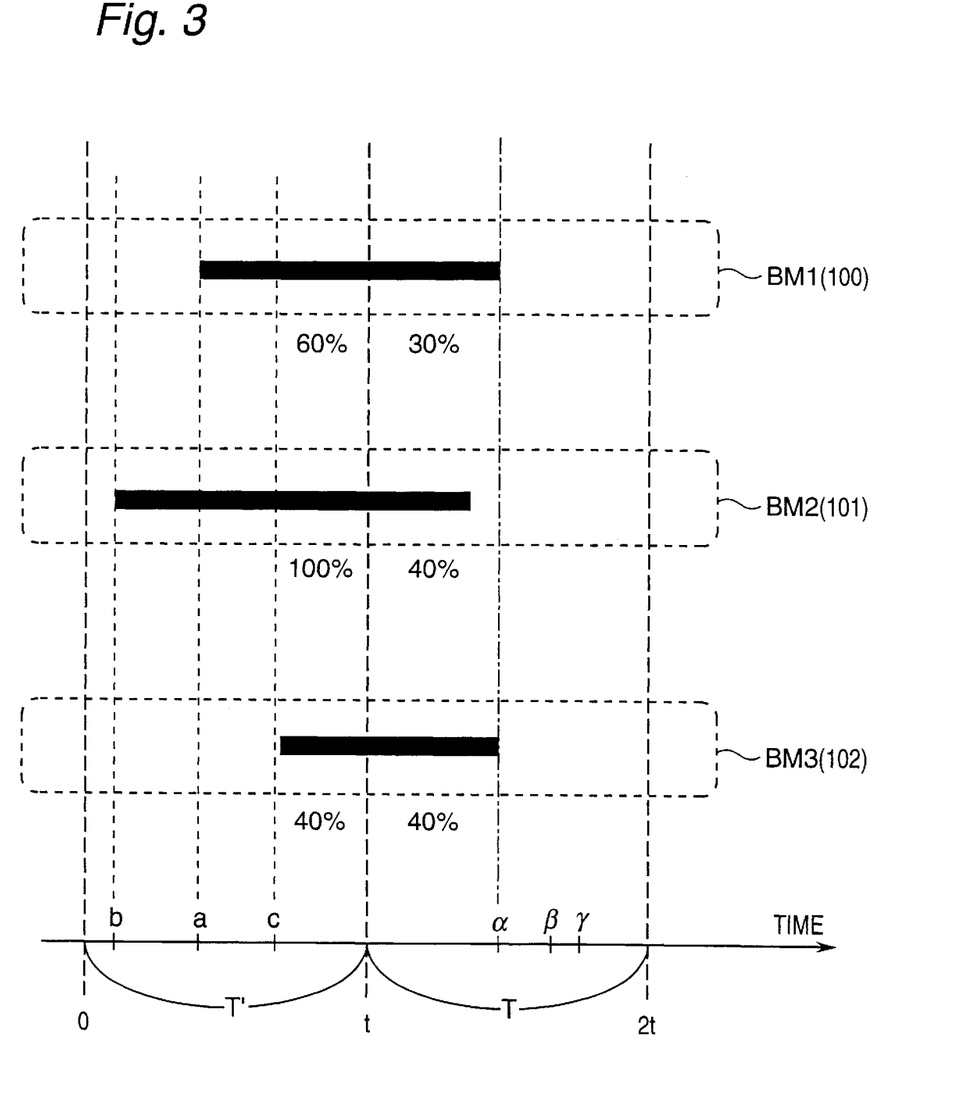
FIG. 3 is a diagram for illustrating a time axis.

In the example shown in FIG. 3, during the period T', MAP1 is 60%, MAP2 is 100% and MAP3 is 40%. At the time point a during the period T, MAP1 is 30%, MAP2 is 40% and MAP3 is 40%.

In addition to these memory access band width achievement rates MAP1, MAP2 and MAP3, the CBMCU 704 records and holds an averaged transfer amount per one cycle, when each of the bus masters BM1 to BM3 obtains the bus authority in one cycle during the period T' (in the following, the averaged transfer amount will be called a "MAV"). After the end of the period T, the MAV of the period T is averaged with the MAV of the period T'. Furthermore, an averaged transfer time MAVT during the period T' of each of the bus masters BM1 to BM3 is additionally recorded. After the end of the period T, the MAVT of the period T is averaged with the MAVT of the period T', similarly to MAV.

The PPU 706 performs a predictive calculation of an address of the shared memory 104 to be accessed by the bus masters BM1 to BM3. The CJU 708 dispatches a processing instruction of the shared memory controller 103 to be executed at the time point α, on the basis of information from the CBMCU 704, the SBMT 705 and the PPU 706. The ARC 707 executes the arbitration for the bus masters BM1 to BM3 in accordance with the instructions from the CJU 708.

Figure 4:
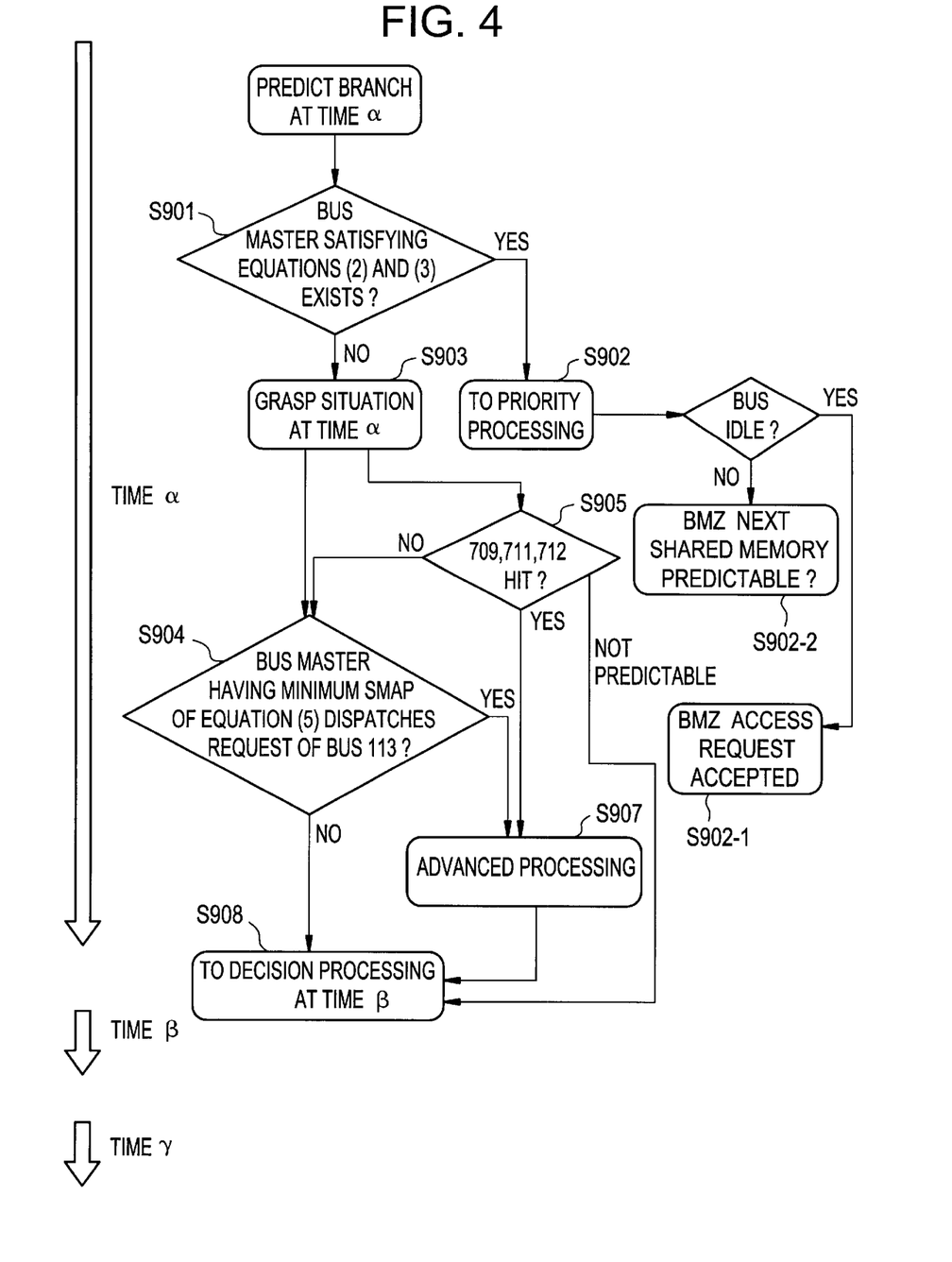
FIG. 4 is a flow chart for illustrating the processing operation at time point α.

Now, a processing operating of the shared memory controller 103 at the time point a will be described with reference to FIG. 4.

In a step S901, whether or not priority processing is necessary without waiting for a request at the time point β, decided based on the information of the SBMT 705 and the CBMCU 704, in order to satisfy the shared memory access band width value of the respective bus masters BM1 to BM3 in the processing after the time point α and after completion of the current memory cycle.

Here, when there exists the bus master satisfying the conditions expressed by equations (2) and (3), which will be described hereinafter, the operation goes to a priority processing of a step S902. If not satisfied, the operation goes to a step S903.

The condition expressed by the equation (2) is that: There is a difference among the respective MAPs of the bus masters BM1 to BM3 in the period T. Here, the bus master corresponding to the minimum value of the MAPs is called a "BMZ", the MAV of the bus master BMZ is called a "MAVZ", and the SBMT of the bus master BMZ is called a "SBMTZ". For a time period from the time point a to the end of the period T (this time period will be called a "period δ" hereinafter), the following relation is satisfied $$MAVZ \times \{\delta \div (\Sigma MAVT)\} < SBMTZ \qquad (2)$$

where $\Sigma MAVT = MAVT1 + MAVT2 + MAVT3$

The condition expressed by the equation (3) is that: If the bus master satisfying the following equation (3) is called a "BMY", there are two or more BMYs. Namely, assuming that a time where the bus master requests the shared memory access during the period T' is "y" and also assuming that the MAP in the period T' is MAPYT' and the MAP until the time point α during the period T is MAPY, $$(\alpha - \gamma) \div T > (MAPYT' + MAPYT) \qquad (3)$$

$$YY = T \times (MAPYT' + MAPYt) \div (\alpha - \gamma) \qquad (4)$$

In the step S902, when the BMZ dispatches the request for the access to the bus 113 at the time point α, and when the bus 113 is in an idle condition, the operation goes to a sub-step S902-1.

In the sub-step S902-1, the access request of BMZ is accepted. When the request of BMZ is a write request, and when the WBFU 711 has a sufficient empty space, a write cycle of BMZ to the shared memory 104 is accepted at the timing point α.

On the other hand, when the request of BMZ is a read request, the WBFU 711 and the PFBFU 712 are snooped to determine the requested address, and when the snooping is hit, a read cycle of BMZ is accepted at the timing point α.

In the sub-step S902-1, if the buffering is interrupted in the WBFU 711 and the PFBFU 712, the cycle for the BMZ is interrupted once, and the interrupted request is restarted at the time point β.

On the other hand, if the bus 113 is not in the idle condition, the operating goes to a sub-step S902-2. In this sub-step S902-2, whether or not a next shared memory cycle of BMZ is predictable is discriminated by the PPU 706. If it is predictable, and if the predicted next shared memory cycle of BMZ is a reading, after completion of the current shared memory cycle executed at the time point α, the MMC 123 of the shared memory controller 103 executes a pre-reading processing, so that a corresponding address is stored in the PFBFU 712, and it is prepared for the shared memory access request from BMZ in advance.

If the predicted next shared memory cycle of BMZ is a writing, the WBFU 711 is prepared to capture the write data of BMZ to the shared memory 104 to a possible extent. Specifically, when the data stored in the WBFU 711 includes data inconsistent with that stored in the shared memory 104, the inconsistent data stored in the WBFU 711 is written back to the shared memory during a period from the timing point β before the request is dispatched from the BMZ.

In the step S902, when the PPU 706 cannot predict, the following processing is carried out, similarly to the case that the prediction is possible and the predicted cycle is a writing cycle. Namely, in order to prepare for a possible request of access to the shared memory from BMZ at the time point β after completion of the current shared memory cycle, the data stored in the WBFU 711 but inconsistent with that stored in the shared memory 104, is written back to the shared memory during a period after the timing point a until the request is dispatched from the BMZ.

In the processing carried out in the above step S902, since the processing after the time point β is determined at the time point α, it is possible to omit a time for discriminating a next control for the shared memory 104 on the basis of the situation at the time point β, and therefore, the efficiency of the shared memory cycle can be elevated.

Next, a processing in the step S903 will be described. If a sum of MAP in the period T' (MAPT') and MAP in the period T (MAPT) is expressed by "SMAP", the following relation holds:

$$SMAP = MAPT' + MAPT \qquad (5)$$

In the step S903, a step S904 and a step S905 are processed simultaneously. In the step S905, the PPU 706 discriminates whether or not a next shared memory cycle of each of the bus master BM1 to BM3 is predictable. If it is not predictable, the operation branches to a decision processing at the time point β in a step S908.

In the step S904, there is discriminated whether or not the bus master having the minimum value of SMAP at the time point α dispatches an access request of the bus 113 to the shared memory controller 103 in order to access the shared memory 104. If there is an access request, the operation goes to the advanced processing of a step S907. On the other hand, if there is no access request, the operation goes to the decision processing at the time point β in the step S908. Since the decision processing at the time point β in the step S908 is known in the prior art, explanation will be omitted.

When the operation goes from the step S904 to the step S907, where the PPU 706 can predict a next shared memory cycle of the bus master having the minimum value of SMAP, the CACN 121 immediately prepares the predicted processing for the MMC 123 and the CBFC 122 so that after completion of the current cycle, the operation goes to the shared memory cell for the bus master having the minimum value of SMAP.

If it is not predictable, during the current cycle executed at the time point α, occurrence of an extra internal replacement of respective buffers of the WBFU 711 and the PFBFU 712 in the cycle of the bus master having the minimum value of SMAP is prevented. For example, if the current shared memory cycle is a reading cycle, data other than the data required in the current cycle is not stored in the PFBFU 712.

Next, explanation will be made with respect to the case where there is no factor of branching from the step S904 to the step S907 and the operation goes from the step S905 to the step S907. When the operation goes from the step S905 to the step S907, the step S907 is divided into substeps. Now, this will be described with reference to FIG. 5.

Figure 5:
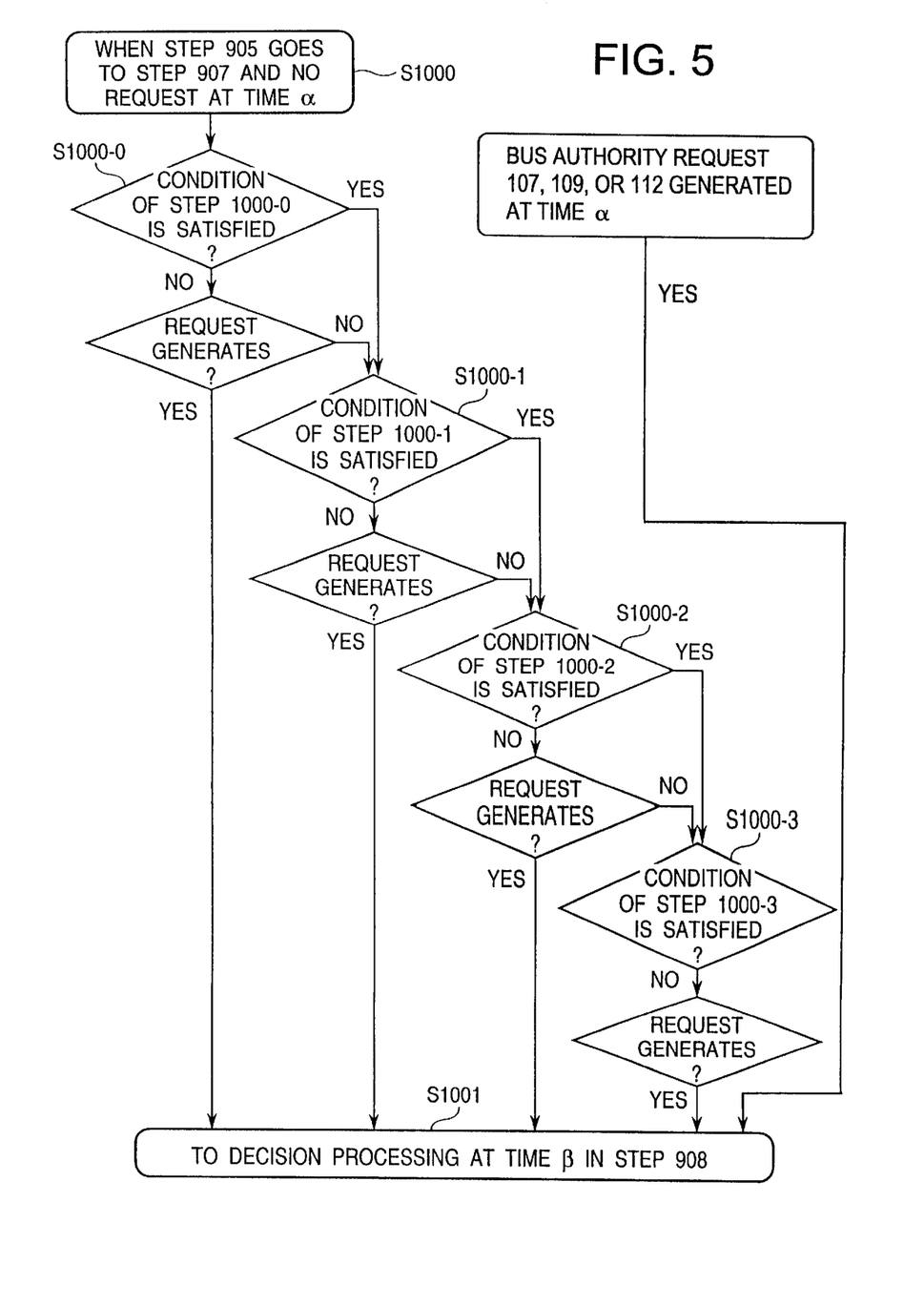
FIG. 5 is a flow chart showing the detail of the advanced processing.

In FIG. 5, a step S1000 corresponds to the case that the operation goes from the step S905 to the step S907 and there is no request for access at the time point α. If any one of the bus authority request signals 107, 109 and 112 is generated at the time point a, the operation goes to a step S1001.

In the step 1000, when conditions of steps S1000-0, S1000-1, S1000-2 and S1000-3 are satisfied in the named order, an advanced processing corresponding to the satisfied conditions is executed until a condition for going to the step S1001 is satisfied, namely, until a request is dispatched from any one of the bus master BM1 to BM3.

In the step S1000-0, when the data stored in the WBFU 711 includes data newer than that stored in the shared memory, the address of the new data is compared with the CSEA+CMP unit 709. If coincidence is obtained, the data of the coincident address is written back to the shared memory 104 immediately after completion of the current shared memory cycle.

On the other hand, if there is no data having the coincident address, the data stored in the WBFU 711 is written back to the shared memory 104 in the order from the data having the longest time.

The step S1000-1 is executed in the course of the processing for writing back the data stored in the WBFU 711 to the shared memory 104 in the step S1000-0. When the PPU 706 predicts that a next shared memory cycle of any one of the bus masters BM1 to BM3 is a reading cycle and the predicted address is coincident with the address of the data to be written back to the shared memory 104, the data to be written back to the shared memory is stored in the PFBFU 712 if the PFBFU 712 has sufficient empty space, in parallel to the processing for writing back the data to the shared memory.

In the step S1000-2, the shared memory controller 103 performs the pre-reading processing on the basis of the prediction, when the PPU 706 predicts that a next memory cycle of some bus master is a reading cycle and the predicted address is not hit to the buffers 711 and 712 (the case that a predicted amount of data is not stored in the buffers 711 and 712), when the pre-reading processing in accordance with the prediction of the PPU 706 is possible without changing the sense amplifier address corresponding to the address of the current shared memory cycle, and when the PFBFU 712 has sufficient empty space.

In the step S1000-3, after completion of the current shared memory cycle, the shared memory controller 103 performs the pre-reading processing on the basis of the prediction of the PPU 706 and stores the pre-read data in the buffer 712, when all of the following conditions are satisfied: The PPU 706 predicts that a next memory cycle of some bus master is a reading cycle and the predicted address is not hit to the buffers 711 and 712, but any sense amplifier address in the devices constituting the shared memory 104, stored in the CSEA+CMP unit 709, is coincident with the address predicted by the PPU 706 (the sense amplifier address corresponds to the predicted address). In addition, when the shared memory bus 114 is driven with the predicted address, a wait based on a penalty is small. Furthermore, the buffer 712 has sufficient empty space to store the data read out from the shared memory 104.

At the time where the memory access request is dispatched from any one of the bus masters BM1 to BM3, the advanced processing of the above mentioned steps S1000-0, S1000-1, S1000-2 and S1000-3 are ended by terminating the currently executed processing, and the operation goes to a processing corresponding to the dispatched request, namely, the decision processing at the time point β in the step S908. Thus, with the discrimination and the advanced processing at the time point α, it becomes possible to control the shared memory with maintaining the respective shared memory access band width values of the bus masters BM1 to BM3 accessing the shared memory 104.

Figure 6:
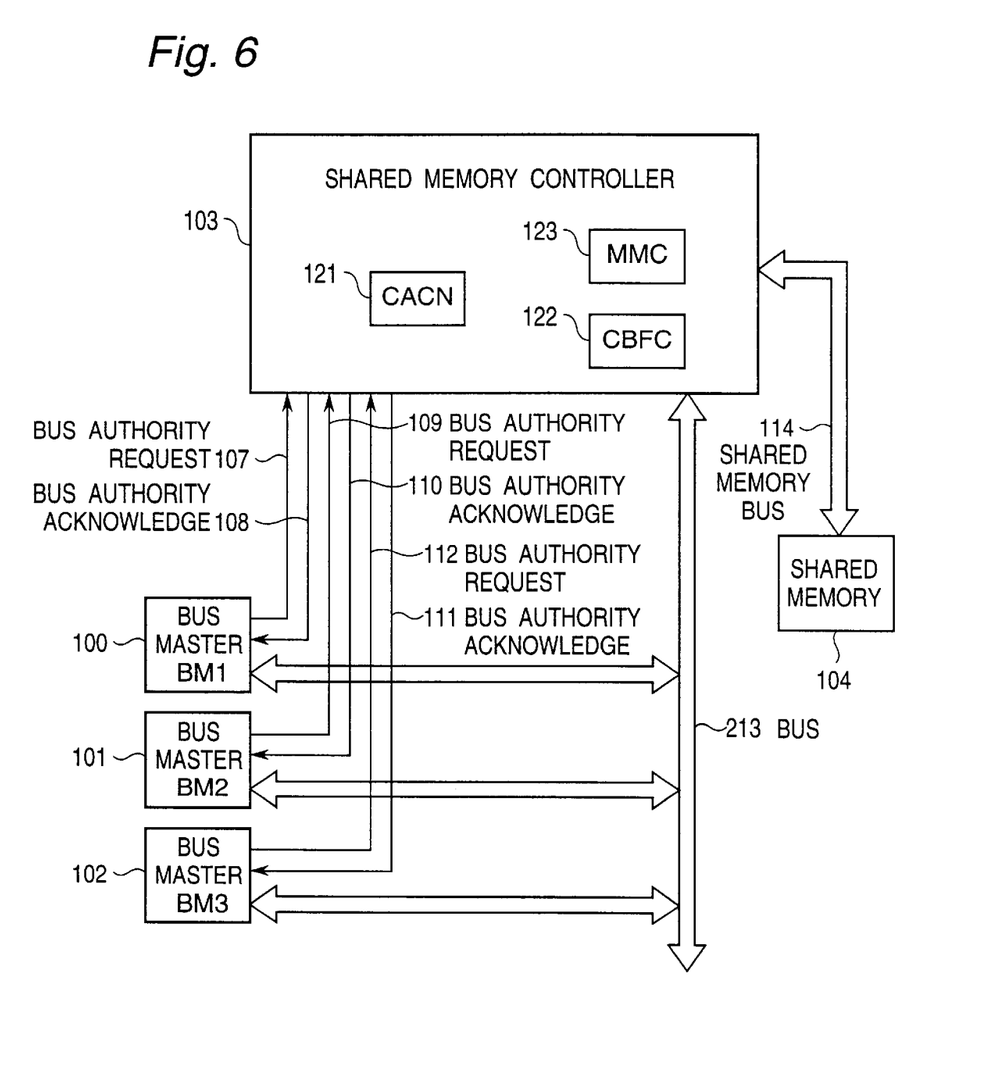
FIG. 6 is a block diagram for illustrating a modification.
Figure 7:
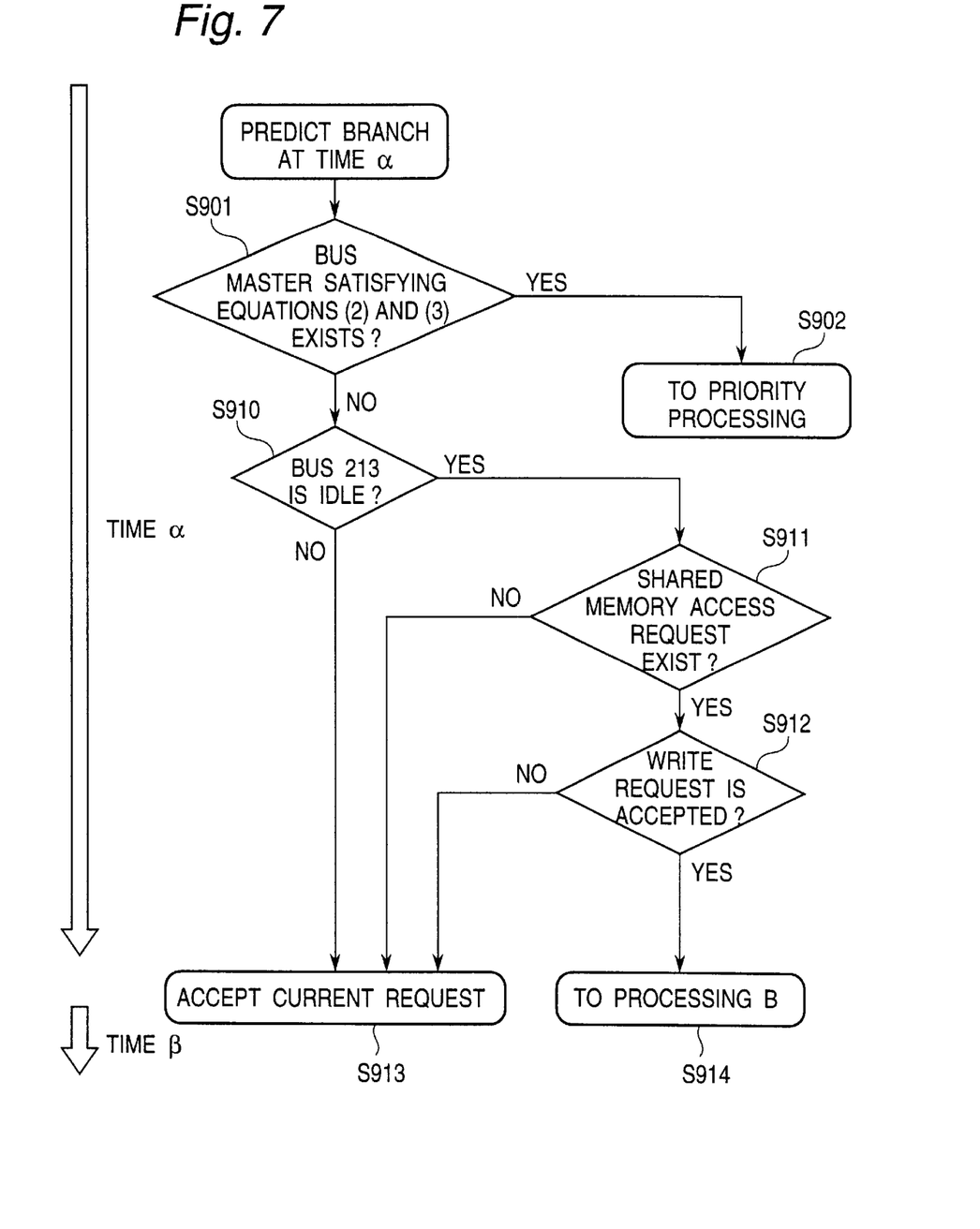
FIG. 7 is a flow chart showing an operation of the modification.

Now, a modification will be described with reference to FIGS. 6 and 7. The shared memory system shown in FIG. 6 is different from that shown in FIG. 1 only in that a bus 213 shown in FIG. 6 is adapted to a split transaction. A processing flow in this system will be described with reference to FIG. 7.

If the branch condition in the step S901 is "YES", the operation goes to the priority processing in the step S902, and the processing similar to the above mentioned embodiment is executed. If the branch condition in the step S901 is "NO", the operation goes to a step S910, in which whether or not the bus 113 is in the idle condition is discriminated.

If the bus 113 is in the idle condition, the operation goes to a step S911, in which the memory access request from the bus masters BM1 to BM3 can be accepted. If the access request exists, the operation goes to a step S912. If the access request does not exist, the operation goes to a step S913.

When the operation goes to a step S912, whether or not the access request is a write request is discriminated. If the access request is a write request, the operation goes to a processing B of a step S914. If the access request is not a write request, the operation goes to a step S913. In addition, if in the step S901 there is no bus master satisfying the condition expressed by the above mentioned equations (2) and (3) and if the bus 113 is not in the idle condition, the operation goes to a step S913.

Since the processing in the step S913 corresponds to the prior art processing in which the address dispatched from the bus master which requests the shared memory at the time point β is accepted and a corresponding processing is executed, explanation will be omitted.

Now, the condition branching to the step S912 will be described in detail. The condition of the step S911 is that the bus 213 is currently in the idle condition and the shared memory bus 11 4 is also currently in the idle condition. Accordingly, the fact that the advanced processing can be executed independently of the bus 114 at the time point a in the step S902, corresponds to the situation where the shared memory access request is a writing request, the data to be written is stored in the write buffer 711 of the shared memory controller 103.

In the step S912, therefore, if the buffer 711 has sufficient empty space and if there is the bus master requesting a shared memory writing, the same bus master is allowed to access again under the split transaction control, so that it becomes possible to store the data to be written to the shared memory and the address of the data to be written, into the buffer 711 at the time point α.

At the time the advanced processing in the step S914 is ended, the operation goes to the step S913, and at the time point β the shared memory 114 becomes idle, the shared memory controller 103 controls the shared memory 104 and the buffers 711 and 712 for another shared memory cycle requested.

As mentioned above, according to the present invention, in the current shared memory cycle, the memory access band value of each bus master is calculated at any time and discriminated to determine the next memory cycle control before completion of the current shared memory cycle. Thus, the minimum memory access band value required by each bus master is maintained with the result that the shared memory can be efficiently utilized.

What is claimed is:

1. A shared memory control method wherein in a current shared memory cycle, a shared memory access band width of each bus master is calculated at any time, and before completion of the current shared memory cycle, a next memory cycle control is determined based upon a comparison of the calculated shared memory access band width of each of the bus masters and a shared memory access band width required per unit time of each of the bus masters so as to maintain a minimum memory access band width required by each bus master.

2. A shared memory control apparatus including a shared memory, and a shared memory controller for controlling a plurality of bus masters accessing the shared memory, the apparatus including a calculating means for calculating, for each of the plurality of bus masters, a shared memory access band width value $\phi$ required per a unit time to the shared memory and a shared memory access band width value $\psi$ at any time in a current shared memory cycle, and a prediction and control means for comparing the shared memory access band width value $\phi$ with the shared memory access band width value $\psi$ to perform, before completion of the current shared memory cycle, a prediction processing for maintaining the shared memory access band width value $\psi$.

3. A shared memory control apparatus including a plurality of bus masters accessing only one shared memory, the apparatus including a means for comparing, for each of the bus masters, a first shared memory access band width value required per a unit time, with a second shared memory access band width value of each bus master calculated at any time in a current shared memory cycle, and a prediction processing means to perform a prediction processing for maintaining the first shared memory access band width value at a predetermined value.

4. A shared memory control method for sharing memory between bus masters comprising:

calculating a shared memory access bandwidth of each of the bus masters at any time in a current shared memory cycle; and determining a next memory cycle control before completion of the current shared memory cycle based upon a comparison of the calculated shared memory access band width of each of the bus masters and a shared memory access band width required per unit time of each of the bus masters to thereby maintain a minimum memory access band width required by each of the bus masters.

5. The method of claim 4, wherein the determining step comprises performing prediction processing based upon the comparison of the calculated shared memory access band width of each of the bus masters and the shared memory access band width required per unit time of each of the bus masters.

6. A shared memory control apparatus including a shared memory, and a shared memory controller for controlling a plurality of bus masters accessing the shared memory, the apparatus comprising:

a calculating means for calculating, for each of the plurality of bus masters, a shared memory access band width value $\phi$ required per a unit time to the shared memory and a shared memory access band width value $\psi$ at any time in a current shared memory cycle;

a prediction and control means for comparing the shared memory access band width value $\phi$ with the shared memory access band width value $\psi$ to perform, before completion of the current shared memory cycle, a prediction processing for maintaining the shared memory access band width value $\psi$.

7. A shared memory control apparatus including a plurality of bus masters accessing only one shared memory, the apparatus comprising:

a means for comparing, for each of the bus masters, a first shared memory access band width value required per a unit time, with a second shared memory access band width value of each bus master calculated at any time in a current shared memory cycle; and a prediction processing means to perform a prediction processing for maintaining the first shared memory access band width value at a predetermined value.

8. A shared memory control method for sharing memory between bus masters comprising:

calculating a shared memory access bandwidth of each of the bus masters at any time in a current shared memory cycle;

determining a next memory cycle control before completion of the current shared memory cycle based upon a comparison of the calculated shared memory access band width of each of the bus masters and a shared memory access band width required per unit time of each of the bus masters to thereby maintain a minimum memory access band width required by each of the bus masters, wherein the determining comprises performing prediction processing based upon the comparison of the calculated shared memory access band width of each of the bus masters and the shared memory access band width required per unit time of each of the bus masters; and executing a pre-reading processing if a determined next memory cycle includes a reading.

* * * * *